Dec. 22, 1953 W. E. HASELWOOD 2,663,425
FLOATING LIQUID INTAKE
Filed Aug. 20, 1949 2 Sheets-Sheet 2
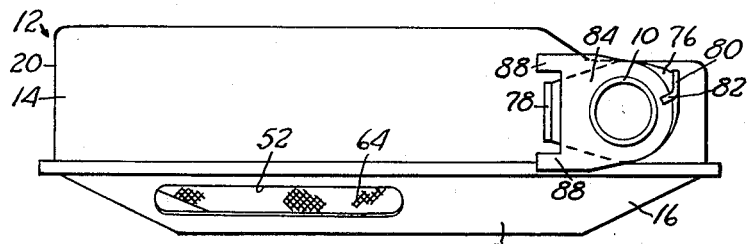
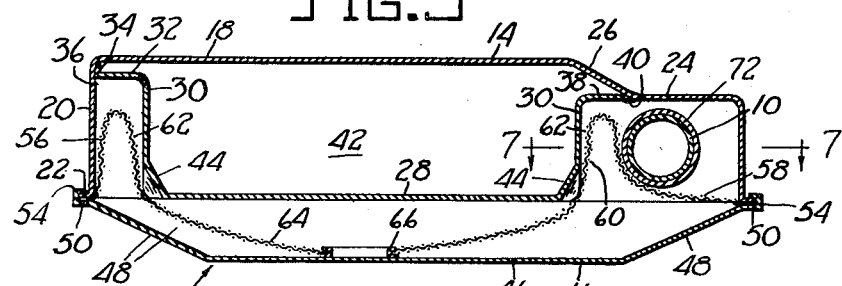
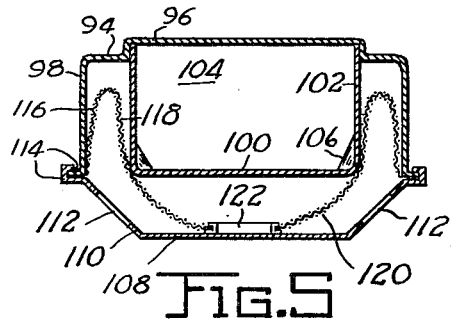
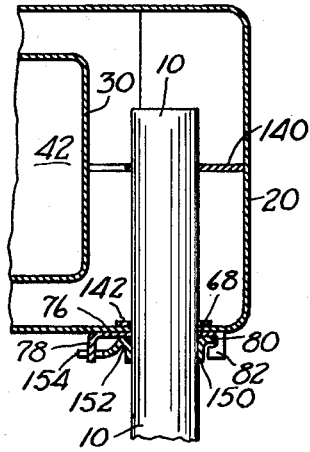
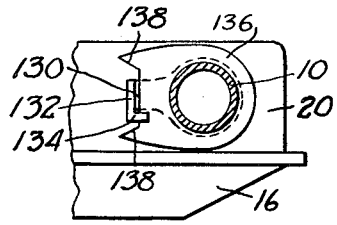
INVENTOR.
WILLIS E. HASELWOOD.
BY
Oltsch & Knoblock
ATTORNEYS.

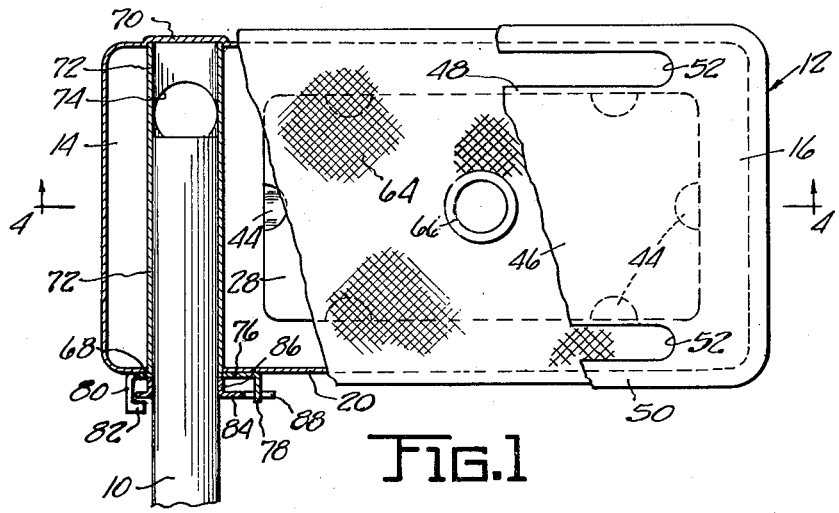
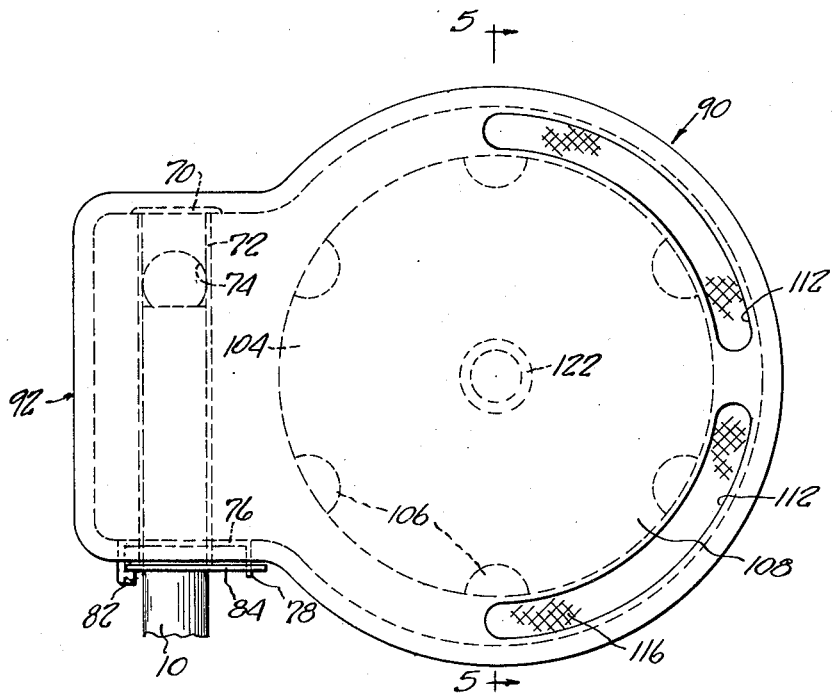

Patented Dec. 22, 1953

2,663,425

UNITED STATES PATENT OFFICE 2,663,425

FLOATING LIQUID INTAKE

Willis E. Haselwood, Elkhart, Ind., assignor to Taylor Sales Engineering Corporation, Elkhart, Ind., a corporation of Indiana Application August 20, 1949, Serial No. 111,551

9 Claims. (Cl. 210—97)

This invention relates to improvements in floating liquid intakes, and more particularly to a floating oil filter usable in internal combustion engines. In devices used in internal combustion engines, the device filters the oil drawn from the sump or oil pan of the engine by a pump for forced lubrication of the engine.

The primary object of the invention is to provide a device of this character having a filter element so arranged with respect to the remaining parts of the device as to accommodate reduction of the overall size or perimeter of the device compared to previous devices for the same purpose, while at the same time maintaining or even increasing the area of the filter compared to previous devices of larger size.

A further object is to provide a device of this character comprising a two-part housing having a sealed float chamber in one portion, spaced from its margin and from the other portion, and having a screen or other filter element spanning the housing and marginally clamped thereto between the housing parts for filtering liquids entering an inlet in one part of the housing and discharging through an outlet in the other part of the housing, said screen being bent to provide a portion of U-shape in cross section surrounding the sealed chamber.

A further object is to provide a device of this character having a filter or screen element of substantially cupped configuration, including a marginally bent skirt portion, and mounting a grommet at its center and normally resiliently urging said grommet against a wall in a valving position, wherein the cupped shape and the skirted margin of the screen accommodates unseating of the grommet from its valving position in response to suction in the event the screen becomes clogged.

A further object is to provide a device of this character including a housing or casing, an inner float part formed within the housing with clearance therearound, and a filter element spanning said housing and having a marginal portion extending around the sides of the float chamber, said float part having marginal indentations therein adapted to accommodate free and unobstructed flow of fluid between the housing portions adjacent to the end and marginal portions of the float part without interference from the screen even in the event the screen contacts the float part between its end wall and its side or marginal wall.

A further object is to provide a device of this character having a housing including a float portion, wherein the parts mutually interfit to facilitate the assembly thereof, to reinforce each other and thereby to reduce warping of the parts incident to brazing, and to permit the use of metal of thinner section than has been feasible for use in devices of this character previously.

A further object is to provide a device of this character wherein a filter element is positively anchored at the perimeter of a casing by a firm mechanical grip or joint between the various parts.

A further object is to provide a device of this character with a simple inexpensive bearing for joining the inlet conduit and the float housing, said bearing including a tube interfitting mechanically at its ends with the float housing and apertured for entry of oil therein.

A further object is to provide a device of this character including a housing mounting an apertured bearing tube wherein an outlet tube fits rotatably, whereby to provide a large bearing area between the outlet tube and the bearing tube and also to provide a capillary oil seal between the parts.

A further object is to provide a device of this character with a novel connection between a conduit and a floating housing, wherein parts carried respectively by said conduit and housing provide a stop for limiting the relative movement of the housing, and wherein one of said parts is adapted to extend partially around the other to lock said housing against separation from said conduit.

A further object is to provide a device of this character which is adapted for quantity production at a reduction in cost of manufacture and material as compared to previous constructions of devices of this character.

Other objects will be apparent from the following specification.

In the drawings:

Fig. 1 is a bottom plan view of one embodiment of the invention with parts broken away.

Fig. 2 is a bottom plan view of a modified embodiment of the invention.

Fig. 3 is a side view of the embodiment illustrated in Fig. 1.

Fig. 4 is a vertical sectional view taken on line 4—4 of Fig. 1.

Fig. 5 is a vertical sectional view taken on line 5—5 of Fig. 2.

Fig. 6 is a fragmentary side view illustrating a modified embodiment of a pivot joint between the parts.

Fig. 7 is a fragmentary sectional view taken on line 7—7 of Fig. 3, and illustrating another embodiment of the invention.

Referring to the drawings, and particularly to Figs. 1, 3, and 4, the numeral 10 designates a conduit to which is pivotally connected a floating oil inlet device 12. The oil inlet device 12 shown in these figures is preferably of substantially rectangular form and comprises a housing having a generally rectangular cup-shaped upper portion 14 and a lower portion 16. The upper housing portion 14 has a top panel 18, integral side walls 20, and a continuous out-turned marginal flange 22.

The housing is substantially oblong, being of greater length than width, and at one end thereof may be of reduced depth as defined by a top portion 24 of less depth than the portion 18 and joined thereto by the inclined portion 26.

A cup-shaped member is secured within the upper chamber portion 14 and, as here shown, comprises a bottom wall 28, side walls 30 extending from the margin of the bottom wall 28, and marginal flanges 32 projecting outwardly from the walls 30 at three sides thereof to extend to the two side walls and one end wall 20 of the housing 14, being upturned at 34 in engagement with said walls and being continuously joined thereto, as by means of copper brazing at 36. At the fourth side of the float insert 28, 30 is preferably formed a flange 38 which extends to the junction of the top portions 24, 26, to which it is anchored or secured as by copper brazing 40. The copper brazed joints 36 and 40 are preferably continuous around the cup-shaped insert 28, 30, 32, 38 so that a liquid-tight float chamber 42 is provided within the housing 14 spaced from the side walls thereof, with the spacing at the reduced thickness end greater than at the other three sides. At spaced points around the perimeter of the float chamber portion, the wall portions 44 are inwardly crimped or offset, as best seen in Fig. 4, for purposes to be described.

The lower portion or bottom 16 preferably includes a horizontal central panel 46, upwardly outwardly inclined panels 48 projecting from the panel portion 46, and marginal flanges 50 adapted to bear against the out-turned flange 22 of the upper casing part 14. The inclined panel portions 48 preferably have large openings or apertures 52 formed therein.

Each of the parts of the housing aforementioned is preferably formed from thin gauge sheet metal, being shaped to the respective forms described by stamping or any other method of working sheet metal found suitable. Each of these parts is preferably formed of the same metal, and the metal of each part is preferably of the same gauge or thickness, in each case tending to derive its strength and rigidity, at least in part, from its shape.

A screen member, preferably formed of interwoven wire mesh of any suitable mesh dimension, is housed within the housing 14, 16 with its margin being clamped continuously between the flanges 22 and 50 of the housing parts. For this purpose one of said flanges, here shown as the flange 50, is bent around the other flange and the margin of the screen in a return bend at 54 to anchor the screen continuously at its margin to the housing and also to continuously secure or connect the two housing parts 14 and 16. The screen has an upturned outer portion 56 extending from the clamped portion at three sides thereof, and at the fourth side has a substantially flat portion 58 which terminates in an upturned portion 60. The portions 56 and 60 form the outer walls of a continuous inverted U-shaped portion whose inner walls 62 extend continuously around the float chamber 42 bearing thereagainst at the junction of the wall portions 28 and 30. The return bent screen portion is of a height less than the height of the housing portion within which it fits, so that the same terminates spaced below the flanges 32 and 38. The central portion 64 of the screen is substantially concavo-convex and has an aperture therein substantially centrally positioned with reference to the housing and the float chamber and mounting a grommet or ring 66 having a central opening therethrough and being normally urged by the screen into flat continuous bearing engagement with the central part 46 of the chamber bottom 16.

As best illustrated in Fig. 1, one of the elongated side walls 20 of the upper housing portion 14 adjacent the reduced thickness end portion thereof has an aperture formed therein at 68. In axial alignment therewith, the opposed elongated side wall 20 is offset at 70, said offset portion being circular and, as here illustrated, being offset outwardly. A tube 72 is provided to span the housing portion 14, being seated at one end within the opening 68 and having an interfitting engagement at its opposite end with the offset 70. In the form shown where the offset 70 projects outwardly, it will be observed that the end of the tube 72 seats within said offset and is positioned thereby. It will be understood, however, that the offset may project inwardly, in which event it would be of a smaller diameter to fit within the end of the tube and similarly to anchor or position the tube. The tube 72 preferably is formed from sheet metal of substantially the same gauge or thickness as the metal forming the remaining parts of the device, and it is anchored fixedly, as by copper brazing, at its opposite ends. The tube 72 has an aperture or other opening 74 formed therein at the end portion thereof adjacent the offset 70. The tube 72 is of such size that its inner diameter will provide a snug journaled fit upon the end of the tube or conduit 10. A fitting, preferably in the nature of a sheet metal member having a flat portion 76, is secured to the housing portion 14, preferably by brazing of the plate portion 76 to the adjacent wall 20. The member 76 may be in the nature of a flat plate having an opening therethrough to fit around and be positioned by the outer end of the tube 72 which projects a slight distance from the housing 14 at the aperture 68. At one end the fitting 76 is preferably provided with a laterally outwardly projecting lug 78. At its opposite end the fitting 76 is preferably provided with a laterally projecting ear 80 spaced from the tube 10 and having a lug 82 radially inturned therefrom in outwardly spaced relation to the plane of the flat portion 76 thereof.

A flat plate or disk 84 having a cylindrical portion 86 projecting therefrom is fixedly mounted upon the tube 10 at the cylindrical portion 86, as by means of copper brazing, soldering or the like. The inner edge of the cylindrical portion 86 is adapted for edge abutment with the outer edge of the tube 72. The plate 84 has a pair of spaced radially projecting arms or legs 88 formed to define a marginal notch in plate 84 which freely receives therein the lug 78 of the fitting 76 and cooperates therewith to limit the angle through which the housing 14 may swing or rock relative to the conduit 10. The inturned lug 82 projecting from the ear portion 80 engages the outer surface of the plate 84, thereby restraining separation of the casing or chamber from the conduit 10 in a direction axially of said conduit.

In the use and operation of the device, the housing unit 12 is mounted upon the conduit 10, as within the oil sump of an internal combustion engine, and adjacent the level to which the oil fills said sump. The provision of the sealed float chamber 42 within the housing 12 permits the housing 12 to float at or adjacent the surface of the liquid within the engine sump at the level determined by parts 76, 86. All liquid which enters the conduit 10 must flow through the intake unit or housing 12 by reason of the character of the construction, thus establishing a flow path from one or more of the apertures 52 in the bottom 16 of the housing 12 through the screen 56—64 into the upper portion 14 of the housing, through which it then flows to the tube aperture 74 for entry into the conduit 10. Thus all liquid passes through the screen under normal circumstances, in which connection it will be observed that the flat face engagement of the grommet 66 with the center wall portion 46 of the bottom panel 16 of the housing 12 normally prevents flow of liquid through the aperture or bore in said grommet or ring 66. In consequence, all liquid which enters the conduit 10 is filtered by the screen as long as free and unclogged filter area remains within the screen.

The screen, in conjunction with the grommet 66 and the bottom panel 46, serves as a valve which can be opened for unobstructed flow of liquid through the grommet aperture in the event the filter screen becomes so clogged that oil cannot pass freely therethrough. Thus as a safety factor, assuming that the screen is so clogged that oil will not flow therethrough, the suction effect acting through the conduit 10, and customarily generated by a liquid pump, will flex the clogged screen in a manner to draw it away from the bottom panel 46 and thereby permit clearance between said bottom panel and the grommet, through which clearance and the grommet aperture oil or liquid may flow, bypassing the screen. The concavo-convex or inverted arched or domed character of the portion 64 of the screen renders the screen normally quite rigid. However, the marginal skirt portions 56, 60 and 62 of the screen, increase the flexibility of the screen and thereby render the screen sufficiently flexible and resilient so that only a small suction is required in order to pull the screen to its valve-open position described above.

Another feature of importance in this construction is that the contact of the screen with the float insert, as at the junction between the bottom wall 23 and the side walls 30 of the float insert, does not interfere with the normal free flow of oil to the conduit aperture 70 after it has passed through the domed portion of the screen below the float chamber, because of the provision of the off-sets or indents 44. These off-sets or indents permit the oil to flow freely to the portion of the casing above the screen from the casing part below the float wall 28 and above the screen part 64 without necessitating flow of oil through the screen.

Other advantages of the construction are that the float-defining part so interfits with the upper portion of the casing as to facilitate assembly, to rigidify the construction, and to reduce the likelihood of warping incident to assembly or securing of the parts, and particularly incident to brazing. The manner in which the parts are constructed also permits the use of metal of thinner gauge than has customarily been possible in units of this character, thereby reducing cost and reducing weight.

The construction of the screen, which permits its margin to extend continuously around the perimeter of the float chamber and which accommodates the positive mechanical gripping of the screen margin between the flanges of the upper and lower casing parts, is important from the standpoint of providing a firm and positive anchor for the screen which will hold it against displacement without requiring means separate from those required to assemble the casing parts. In other words, the construction is such that the operation of assembling the parts of the casing also serves automatically to effectively clamp or secure the screen against displacement.

Another advantage of the construction of considerable importance is the formation of the pivot joint connecting the housing 12 with the inlet conduit and the arrangement of the screen with reference thereto which eliminates the necessity for a conduit passing through the screen, or the float chamber, as has been required in previous constructions. Attention is particularly directed to the fact that a firm anchorage between the tube 72 and the casing is provided, that the conduit 10 has a large area of bearing or contact surface within the tube 72, that the length of the bearing surface between the conduit 10 and the tube 72 provides, by a simple telescopic fit of the parts one within the other, and without high accuracy of dimension of the interfitting parts, a capillary oil seal which prevents oil from entering the interior of the conduit 10 by passing between said conduit and the tube 72.

Still another advantage of the construction is in the arrangement of the stop which provides means to limit the pivotal throw or play of the casing and also to prevent separation of the casing from the conduit 10. In this connection it will be observed that the bearing engagement of the inner end of the cylindrical part 86 against the end of the tube 72 provides an effective seal tending to resist the entry of oil surrounding the conduit 10 into the space between that conduit and the tube 72. At the same time, the stop parts, being welded or otherwise fixed upon the conduit and the casing, can be accurately positioned by any suitable registry or guide means (not shown) during the assembly to facilitate rapid, low cost production of the device.

The device is adapted to be constructed in many other forms than illustrated in Figs. 1, 3 and 4. One such alternative form is illustrated in Figs. 2 and 5. As illustrated in Fig. 2, the general shape of the device is changed from rectangular shape to a substantially circular shape. In other words, in Fig. 2 is shown a main body or housing portion 90 of circular shape or outline, from which projects radially a portion 92 of part-rectangular outline and in general corresponding to the construction of the left-hand end of the form of the device illustrated in Figs. 1, 3 and 4, particularly with reference to the provision therein of a tube 74 to receive the conduit 10, and the provision also of the cooperating stop parts 76 and 84. In this form of the embodiment, the top wall 94 of the casing has an outwardly upwardly off-set portion 96 spaced from the side walls 98 thereof. This off-set is preferably concentric with the portion 90. A cup-shaped member having a bottom wall 100 and a cylindrical side wall 102 is of a size to fit snugly within the off-set 96 to be welded thereto. This construction provides a sealed float chamber 104 by a construction slightly different structurally from the construction of the float chamber as illustrated in Fig. 4. This float chamber defining member 100, 102 will be provided with the same type of indents or off-sets 106 at perimetrally spaced points at the junction of the float parts 100 and 102, as provided at 44 in the other embodiment.

In this embodiment of the invention the bottom portion 108 of the casing will be provided with the inclined portions 110 preferably concentric with the circular portion 90 of the housing and interrupted by the apertures 112 through which oil or other liquid may enter the casing. The part 108 is secured to the upper housing part by means of the outwardly projecting flanges 114 on the parts which are crimped, one around the other, and clamp the margin of a filter screen. This filter screen is preferably of the same construction described above, having a portion 116 projecting upwardly from its margin to a level slightly below the top wall 94, a marginal skirt 118 surrounding the float chamber 104, and a central concavo-convex portion 120 which is interrupted by an apertured grommet 122.

It will be apparent that oil entering this device through one of the apertures 112 may pass through the screen at any point thereof in its passage to the aperture 74 of tube 72 within which the discharge conduit 10 fits telescopically. The same advantages of large area of screen in a small and compact housing, which characterize the preferred embodiment of the invention, also characterize this construction. The float chamber is formed in a somewhat simpler manner than in the preferred construction but serves the same purpose. The various other advantages mentioned above with reference to the preferred embodiment are also believed to reside within this construction.

Another embodiment of the invention is illustrated in Fig. 6 and is directed particularly to the arrangement of the stop means for limiting the pivotal movement of the buoyant housing and restraining release thereof from the conduit. As here illustrated, the side wall 20 of the upper portion of the housing supports means for journaling the inlet conduit 10, which means may be in the nature of the tube 72 shown in Fig. 1, or any other means found suitable. Fixed upon the casing side wall 20 is a fixture 130 preferably including a cylindrical portion apertured for snug fit of the conduit 10 therein. The fixture 130 has a lug 132 bent perpendicularly outwardly therefrom, and at its outer end the lug 132 has a flange 134 bent perpendicularly and inwardly toward the conduit 10. The conduit 10 carries a plate 136 fixedly secured thereto, as by welding or brazing, which plate 136 is cut away to fit with clearance around the lug 132 and provide a pair of confronting arms 138 spaced apart a distance greater than the width of the lug 132, positioned therebetween so that the rocking or rotative movement of the member 130 and of the float relative to the member 136 and the conduit will be limited in a predetermined stroke depending upon the spacing of the arms 138 and the width of the lug 132 fitting between said arms. The ear or flange 134 bears against or is located adjacent to the outer surface of the plate 136 and forms means for preventing the casing from being released from the conduit 10 by sliding movement axially of said conduit. The fixture 130 is preferably formed of sheet material so that the ear or flange 134 may readily be bent therefrom after the parts have been assembled. This construction has the same advantages as the construction illustrated in Fig. 1, consisting of the parts 76—88, but is somewhat simpler, in that the elements 132, 134 are formed integrally and are so interrelated that the construction is somewhat simplified and the amount of material required is somewhat reduced.

While the construction illustrated in Fig. 1 for pivotal mounting of the buoyant housing on the conduit 10 is preferred, another arrangement which may be employed is illustrated in Fig. 7. This construction is particularly well suited to the rectangular form of the device, as illustrated in Figs. 1, 3 and 4. In this construction, a plate 140 is welded or brazed centrally to extend between the end wall 30 of the float insert 42 and the adjacent end wall 20 of the upper casing portion. The plate 140 may be notched between the conduit 10 and the float 42, if desired, to facilitate the introduction of a bent portion of the skirt of the screen, as explained above. The plate 140 has an aperture therein aligned with the aperture 68, which aperture 68 and the aperture in plate 140 both are of a size to snugly and rotatably receive the conduit 10. An apertured plate 142 may be brazed to the inner surface of the side wall 20 with its aperture in register with the aperture 68 so that it serves as a means to increase the thickness of the casing wall at the point through which the conduit 10 passes. Similarly, a plate or fitting 76 having an out-turned lug 78 may be brazed or otherwise secured to the outer surface of the wall 20, being similarly apertured in register with the aperture 68 to fit snugly around the tube 10. The plate 76 may have the ear 80 and the lug 82 projecting therefrom, as previously described. The conduit 10 has brazed or otherwise secured thereto a cylindrical part 150 which terminates in a circular rib 152 adapted to bear flat against the plate 76 to form a continuous sealing engagement with said float surrounding the conduit 10. The parts 150, 152 may have spaced projections 154 corresponding to the ears 88, Figure 1, located at opposite sides of the tongue or lug 78 of the plate 76 and serving as stops to limit the pivotal movement of the housing relative to the conduit 10.

It will be observed that, by the Fig. 7 construction, the securing of an elongated tube 72 within the casing is eliminated and the conduit 10 extends directly into the casing clear of the filter screen and of the float chamber, and supported at the aperture of the outer wall and at the aperture of the spacer wall 140. This support insures against undesirable free play of the parts and limits relative play to pivotal movement about the axis of the conduit 10. The extent to which the conduit 10 projects into the filter casing is determined by the position of the parts 150—154 upon the conduit, said parts serving to prevent the conduit 10 from extending completely across the interior of the casing and thus insuring that the inner end of the conduit will be open for passage of oil thereto at all times. The engagement of the rib 150 with the plate 76 forms an effective seal in conjunction with the formation of the apertures at 68 and in the parts 76 and 142 to such size as to limit the clearance of the conduit 10 therein. The separation of the casing from the conduit is provided by the lug 82 as described above.

While the preferred embodiments of the invention have been illustrated and described herein, it will be understood that changes in the construction may be made within the scope of the appended claims without departing from the spirit of the invention.

I claim:

1. A floating liquid intake device comprising a housing formed of an upper part and a lower part and having an inlet opening in said lower part and outlet opening in said upper part, a cup-shaped member marginally secured to said upper part spaced from the sides thereof to define a sealed buoyant chamber, a conduit leading from said outlet opening, and a cup-shaped screen spanning said housing and continuously marginally clamped between the margins of said housing parts, said screen including an off-set marginal portion of inverted substantially U-shape in cross-section surrounding said cup-shaped member.

2. A floating liquid intake device as defined in claim 1, wherein said cup-shaped member is spaced above the lower part of said housing and its lower marginal portion is indented at spaced points.

3. A floating liquid intake device comprising a housing having a bottom, top and side walls, a structure defining a sealed air chamber in the upper part of and spaced from the side and bottom walls of said housing, a screen spanning said housing and marginally secured thereto, said screen having a folded marginal part projecting into the space around said chamber-defining structure, said housing having an inlet opening below said screen and an outlet opening above said screen said folded screen part including an upturned outer marginal portion and a downturned inner marginal portion and being of a height less than the height of the housing.

4. A floating liquid intake device as defined in claim 3, wherein said screen normally engages said chamber defining structure only at a limited and discontinuous portion of the perimeter thereof.

5. A floating liquid intake device as defined in claim 3, said screen including a concavo-convex portion below said chamber defining structure having a central aperture and normally bearing against said bottom wall at the margin of said aperture.

6. A floating liquid intake device as defined in claim 3, said screen including a cupped central portion having a central aperture, and a grommet carried by said screen in said aperture and normally bearing flat against said bottom wall.

7. A floating liquid intake device comprising a housing having top, bottom and side walls, a structure secured in said housing spaced from the bottom and side walls and defining a buoyant chamber in said housing, a filter member continuously marginally anchored to and spanning said housing between the top and bottom thereof, a conduit, and a member carried by and positioned within said housing and journaling said conduit with the inner end of said conduit in communication with the interior of said housing at one side of said filter member, said housing having an opening therein at a portion separated from said conduit by said filter member said filter member having a portion underlying and spaced from said chamber-defining structure, a substantially upright inner wall portion and a substantially upright return bent marginal outer wall portion, said inner and outer wall portions fitting between said chamber-defining structure and the side walls of said housing.

8. A floating liquid intake device comprising a housing having top, bottom and side walls, a structure secured in said housing spaced from the bottom and side walls and defining a buoyant chamber in said housing, a filter member continuously marginally anchored to and spanning said housing between the top and bottom thereof, a conduit, and a member carried by and positioned within said housing and journaling said conduit with the inner end of said conduit in communication with the interior of said housing at one side of said filter member, said housing having an opening therein at a portion separated from said conduit by said filter member, said filter member including a marginal portion of inverted U-shape offset upwardly and positioned between said chamber-defining structure and said side walls.

9. A floating liquid intake device comprising a housing having top, bottom and side walls, a structure secured in said housing spaced from the bottom and side walls and defining a buoyant chamber in said housing, a filter member continuously marginally anchored to and spanning said housing between the top and bottom thereof, a conduit, and a member carried by and positioned within said housing and journaling said conduit with the inner end of said conduit in communication with the interior of said housing at one side of said filter member, said housing having an opening therein at a portion separated from said conduit by said filter member, said filter member including a central apertured cupped portion normally bearing against the bottom of said housing around the aperture therein, an inverted skirt portion substantially encircling said chamber-defining structure, and a marginal portion downwardly return bent from the upper end of said skirt portion.

WILLIS E. HASELWOOD.

References Cited in the file of this patent

UNITED STATES PATENTS

| Number | Name | Date |
|---|---|---|
| 2,192,438 | Gulick | Mar. 5, 1940 |
| 2,318,220 | Hazelwood | May 4, 1943 |
| 2,335,096 | Zech | Nov. 23, 1943 |
| 2,448,212 | Dewey | Aug. 31, 1948 |
| 2,508,952 | Kline | May 23, 1950 |